(12) United States Patent
Guagliardo

(10) Patent No.: US 7,303,472 B2
(45) Date of Patent: Dec. 4, 2007

(54) INTERACTIVE PROFESSIONAL WRESTLING FANTASY CONTEST SYSTEM

(76) Inventor: Anthony V. Guagliardo, 39 Smallwood La., Manalapan, NJ (US) 07726

( * ) Notice: Subject to any disclaimer, the term of this patent is extended or adjusted under 35 U.S.C. 154(b) by 665 days.

(21) Appl. No.: 10/742,143

(22) Filed: Dec. 22, 2003

(65) Prior Publication Data

US 2005/0137728 A1 Jun. 23, 2005

(51) Int. Cl.
*A63F 9/24* (2006.01)
(52) U.S. Cl. .................................................. 463/40
(58) Field of Classification Search ............. 463/42, 463/4, 40, 41
See application file for complete search history.

(56) References Cited

U.S. PATENT DOCUMENTS 4,918,603 A * 4/1990 Hughes et al. ................ 463/4
5,018,736 A * 5/1991 Pearson et al. .............. 463/29
5,263,723 A * 11/1993 Pearson et al. .............. 463/41
5,860,862 A * 1/1999 Junkin ......................... 463/40
6,193,610 B1 * 2/2001 Junkin ......................... 463/40
6,669,565 B2 * 12/2003 Liegey ......................... 463/42

OTHER PUBLICATIONS

"WWE Fantasy", WWE fantasy scoring details http://www.wwe.com/play/fantasy/scoring/.*

* cited by examiner

*Primary Examiner*—Robert Pezzuto
*Assistant Examiner*—Eric M. Thomas
(74) *Attorney, Agent, or Firm*—Charles I. Brodsky

(57) ABSTRACT

In an interactive contest system which permits competition among a plurality of remote participants as a professional wrestling fantasy league, a method employing a database storage means for storing a preferred wrestling team roster and rating scores attributable thereto in determining winners and losers of a scheduled competition in accordance with a predetermined set of identifying criteria and point values in a second database associated with performances of a wrestler before, during and after any arranged match.

3 Claims, 2 Drawing Sheets

|    | NAME | ABBREVIATION | POINTS |
| --- | --- | --- | --- |
| a. | TV TIME | TVT | 2 |
| b. | TV MICROPHONE | TVM | 5 |
| c. | WRESTLING | WRE | 3 |
| d. | SPECIAL MATCH | SPM | 5 |
| e. | WINNING A MATCH | WIM | 3 |
| f. | WINNING A SPECIAL MATCH | WSM | 7 |
| g. | WINNING A FINISHING MOVE | WFM | 7 |
| h. | WINNING-DISQUALIFICATION | WDQ | 2 |
| i. | FINISHING MOVE | FIN | 4 |
| j. | OPENING | OPN | 8 |
| k. | OPENING SHOW W/MATCH | OPM | 4 |
| l. | MAIN EVENT | MNE | 10 |
| m. | STRIKING AN AUTHORITY | STA | 6 |
| n. | SHOW STOPPERS | SST | 10 |
| o. | LOSING A MATCH | LOS | 3 |
| p. | LOSING/DISQUALIFICATION | LDQ | 2 |

FIG 2

INTERACTIVE PROFESSIONAL WRESTLING FANTASY CONTEST SYSTEM

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to an interactive sports contest system which allows remotely located participants to compete with one another. More particularly, it relates to an interactive professional wrestling fantasy contest system in which team rosters and rating scores are utilized in determining winners and losers of a scheduled competition between the remote participants.

2. Description of the Related Art

As is known and understood, interactive contest systems are known and have been developed for various sports team competitions commonly known as "fantasy baseball", "fantasy football", and "rotisserie league". One such system is that set out in U.S. Pat. No. 5,263,723, described for use in interactive baseball, basketball, football, hockey, soccer, golf and other events, where individual player performances may be presented in the form of selected statistics, and wherein each participant in the contest is given a certain amount of imaginary dollars with which to purchase a subset of selected players.

Although such interactive contest system may perform its described operations, a reading of it quickly illustrates how complicated it is—including central controllers, data terminals and links, statistical and team roster databases, player scoring computers, etc.—all of which must interact precisely to determine the individual scores. In describing a fantasy basketball league, for example, computer formula are utilized to take into account minutes played, field goals made and missed, 3-point goals made and missed, free throws made and missed, rebounds, assists, technical fouls, personal fouls, and the number of games in which the selected player's team won or lost. Clearly, that becomes quite different for a participant in such contest competition to determine how he/she is doing at any instant of time. Formula for other types of fantasy sports competitions are also set out, noted as being usable for implementation with other athletic events, but similarly exhibit the same problems in not allowing a participant to keep up with the scoring as it goes along.

Obviously, if someone wished to compare his/her own skills of selection without actually participating in such competition, that cannot be done with contests of this type without joining in on the league, and paying its required participation fee. Equally obvious is that by being assigned a certain number of imaginary dollars with which to purchase players available—so that the participant with the highest return on investment is there declared to be the contest winner—the interactive contest system which results is simply not one readily and easily usable, except by a limited number of diehard participants.

SUMMARY OF THE INVENTION

As will become clear from the following description, an interactive contest system for use in a professional wrestling fantasy league according to the present invention can be easily implemented, and easily scored by its individual participants with pen and paper at the same time. As will be appreciated, this follows from the fact that televised professional wrestling competitions on network or cable are set by a promotion company having a "stable" or roster of wrestlers within its organization. Worldwide Wrestling Entertainment, Inc., for instance, has some 100 professional wrestlers under its control who regularly appear on one of its Monday, Thursday and Sunday wrestling programs, and sometimes on two or more of them each week. In accordance with the teachings of the invention, competition may be had among a plurality of remote participants in such a professional wrestling fantasy league by aggregating to each participant several of these professional wrestlers to form a team roster, and rating scores attributable to their performances during these television show appearances in accordance with a predetermined set of identified database criteria. In a one-month's series of televised appearances of these wrestlers, participant "winners" and "losers" can be determined depending upon what happens during these televised showings.

BRIEF DESCRIPTION OF THE DRAWING

These and other features of the invention will be more clearly understood from the following description, taken in connection with the accompanying drawing, in which:

FIG. 2 illustrates a point ascribing system according to the invention.

DETAILED DESCRIPTION OF THE INVENTION

Figure 1:
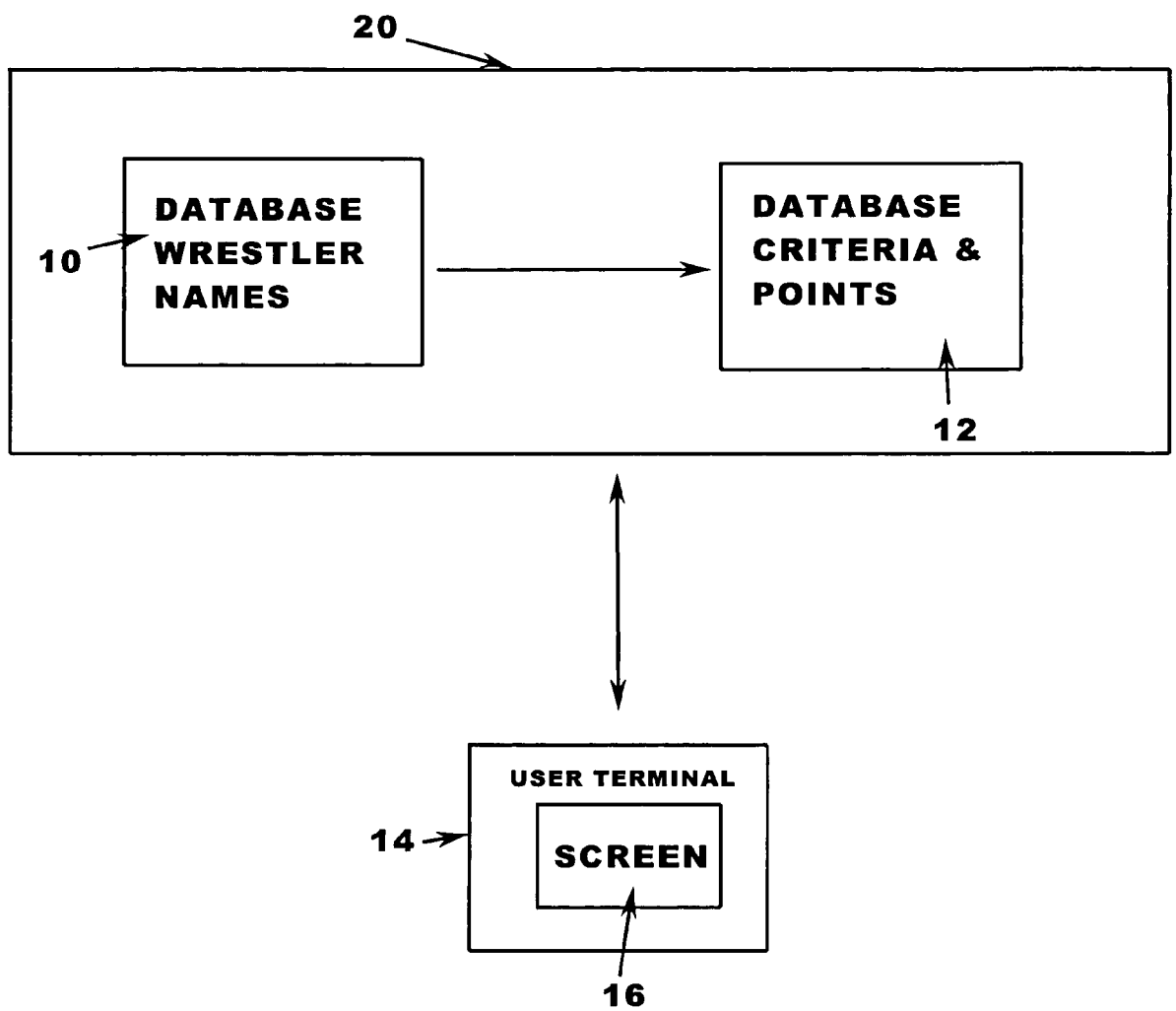
FIG. 1 is a simplified block diagram helpful in an understanding in its operations.

As will become clear from the description below, identified database criteria maintained by the system operator 20 assigns positive point values to a first predetermined set of televised professional wrestling performances, and/or assigns negative point values to a different set of televised professional wrestling performances. For example, points can be established for a "drafted" wrestler when he/she is the winner of a match, is the winner of a main-event match, or is the winner of a match through the use of a specialized move unique to that wrestler. At the same time, different sets of points can be established for one of the winning of a match by disqualification, winning an opening match of the televised show appearance, or being interviewed as part of the televised show itself. Correspondingly, negative points can be awarded according to the invention for one's losing a match, for being disqualified from a match, or by assaulting someone who is associated with the television show appearance other than the wrestling opponent—e.g., a referee, an announcer, a ringside official, etc.

As will be seen below, different ways exist for viewers to compete in contest with these various wrestling entertainments, and in a simple manner which allows him/her to "score" for their own "drafted" wrestlers, as well as for those which they may not have selected.

In accordance with the invention, three manners of participation in the contest system are available, with one of them preferably slated for a series of competitions along the lines of head-to-head contests similar to that in which competitions exist between seeded athletes and/or their teams, as #1 against #15, #2 against #14, #3 against #13, and so forth, hopefully resulting in a final competition between successful winners, #1 against #2. In accordance with a preferred point ascribing system as presently envisioned, points may be awarded (or subtracted) in the following manners, and in the amounts set forth, and for the indicated criteria assigned to such database.

| NAME | ABBREVIATION | POINTS |
|---|---|---|
| a. TV TIME | TVT | 2 |
| b. TV MICROPHONE | TVM | 5 |
| c. WRESTLING | WRE | 3 |
| d. SPECIAL MATCH | SPM | 5 |
| e. WINNING A MATCH | WIM | 3 |
| f. WINNING A SPECIAL MATCH | WSM | 7 |
| g. WINNING A FINISHING MOVE | WFM | 7 |
| h. WINNING-DISQUALIFICATION | WDQ | 2 |
| i. FINISHING MOVE | FIN | 4 |
| j. OPENING | OPN | 8 |
| k. OPENING SHOW W/MATCH | OPM | 4 |
| l. MAIN EVENT | MNE | 10 |
| m. STRIKING AN AUTHORITY | STA | 6 |
| n. SHOW STOPPERS | SST | 10 |
| o. LOSING A MATCH | LOS | 3 |
| p. LOSING/DISQUALIFICATION | LDQ | 2 |

A description of these criteria as illustrated in FIG. 2 according to the invention may be as following:

a. (TVT)—awarded anytime one of the "drafted" wrestlers is seen on camera;

b. (TVM)—awarded anytime one of the "drafted" wrestlers speaks on a television microphone and is heard by the audience;

c. (WRE)—awarded when participating in a regular singles or tag-team match;

d. (SPM)—awarded anytime one of the "drafted" wrestlers appears in a Title Match, a Hard-Core Match, a Rumble or any other match deemed to be special;

e. (WIM)—awarded anytime one of the "drafted" wrestlers wins any type of match;

f. (WSM)—awarded anytime one of the "drafted" wrestlers wins a special match as identified in "d" above;

g. (WFM)—awarded where one of the "drafted" wrestlers successfully employs one of his/her finishing moves to win a match;

h. (WDQ)—awarded when winning a match because of disqualification;

i. (FIN)—awarded when the "drafted" wrestler employs one of his/her finishing moves during the course of a match;

j. (OPN)—awarded when the "drafted" wrestler opens the televised show with live action other than participating in a match;

k. (OPM)—awarded when the "drafted" wrestler opens a televised show with any type of match;

l. (MNE)—awarded when the "drafted" wrestler wrestles in a main event, or, for example, as the last match of a televised show;

m. (STA)—awarded when the "drafted" wrestler strikes a person of authority as a referee, announcer, or promoter;

n. (SST)—awarded when the "drafted" wrestler is involved with a special interview segment of a show;

o. (LOS)—awarded when the "drafted" wrestler loses any type of match; and p. (LDQ)—awarded when the "drafted" wrestler loses a match because of disqualification.

In carrying out the invention, and illustrating how it might be utilized with a professional wrestling promoter having 100 or so professional wrestlers under contract, 10 remote participants may be joined into a league, with each one in turn selecting through its own data terminal 14 one of the 100 wrestlers in forming a team roster—the first selecting from the group of 100, the second selecting from the remaining 99, the third from the remaining 98, etc. Such list of wrestlers forming its own database storage means 10, might include for the Worldwide Wrestling Entertainment, Inc. promotion, The Rock; Brock Lesnar; Kevin Nash; Steve Austin; Big Show; Kurt Angle; Undertaker, etc. Eight wrestlers selected by each participant would then form a "team".

During preferably a one-month's worth of televised show appearances, each participating contestant could then watch each televised wrestling show on network or cable, entering the point awards scored (positive, or negative) not only for his/her "drafted" wrestler, but for all those contracted with the promoter while the show is being televised. At the end of each show, the participant would then be able to score his/her own team's performance, and compare it with that available with other groupings of selected wrestlers. At the end of the time period in question, an overall winner would be determined as such scoring is likewise being simultaneously maintained by the system operator in its own database 20 of match watching. (A second database storage means 12 listing the points to be awarded, as well as each wrestler's finishing moves would be maintained as well, linked with the first database and updated as needed.) Depending upon the number of players participating in a competition, 15, 31 or 63 other winners of like 10-contestant leagues could be determined, to then be followed in a final tournament—as, by participating in a further one week competition between pairs of winners, with the individual winner of each such pair continuing to compete against one another until an ultimate winner is declared. In such competition, a fee could be charged for each participant—of some $19.95 for example—with the prize ultimately awarded being determined on the numbers of participants who choose to compete.

In a second manner of play, individuals can elect just to play for "fun", without engaging in head-to-head competition in league format. There, a person could just sign up for one-month of play, selecting on the terminal Internet screen 16 his/her use name and password along with the names of the wrestlers "drafted", for the system operator to maintain the scoring and reporting back with the outcome.

In a third manner of play, the Internet user could form their own league, with its own set of rules, abbreviations and points to be assigned to any televised criteria, for the system operator to maintain that as well, and to provide the results once the selected time period has run its course.

As will be understood, these manners of use of the present invention allow the professional wrestling fan to keep score whenever watching a televised network or cable wrestling show in comparing his/her selections against those of others. Of course, while a participant-by-participant individual draft of available wrestlers from the professional wrestler "List" as the numbers decrease, is one which leads to a fairer end result when judging a competition—as compared to each just selecting at the beginning of a one-month's competition just the most popular fan favorites—going ahead even in this manner increases viewer interest as the matches progress, rather than in only watching those matches involving the more prominent wrestling "superstars". Watching a match between lesser known personalities would then promote enhanced viewer involvement as the points awardable would be the same where the lesser personality wins a match, employs a finishing move, or is disqualified, in equal numbers to that attributable with the name performers as Brock Lesnar or Steve Austin.

While there have been described what are considered to be preferred embodiments of the present invention, it will be readily appreciated by those skilled in the art that modifications can be made without departing from the scope of the teachings herein. Thus, whereas the foregoing description assigns predetermined "positive" and "negative" points of prescribed amounts for criteria associated with the happening of any wrestling match event, different criteria and/or points can be established—as winning or losing by pin fall, winning or losing by "giving up", winning or losing by "being counted out", or winning or losing a "championship". For at least such reason, therefore, resort should be had to the claims appended hereto for a true understanding of the scope of the invention.

I claim:

1. In an interactive contest system which permits competition among a plurality of remote participants as a professional wrestling fantasy league employing storage means for storing a professional wrestling team roster and rating scores attributable thereto in deciding winners and losers of a scheduled competition, a scoring system ascribing predetermined point values to network and/or cable television appearances and in accordance with a predetermined set of identified database criteria associated therewith, wherein said identified database criteria assigns positive point values to a first set of predetermined televised wrestling performances including at least one of a professional wrestler's speaking on a television microphone, winning a match, winning a main event match, and winning a match by a specialized move unique to that wrestler.

2. The scoring system of claim 1 wherein said identified database criteria also assigns positive point values to a first set of predetermined performances including at least one of winning a match by disqualification, winning an opening match of a televised show appearance, and being interviewed as part of said televised show.

3. The scoring system of claim 2 wherein said identified database criteria additionally assigns negative point values to a first set of predetermined performances including at least one of a wrestler's being disqualified from a match, losing a match, and striking a figure of authority associated with the television show appearance.

* * * * *